(12) United States Patent
Sambhy et al.

(10) Patent No.: US 10,214,662 B1
(45) Date of Patent: Feb. 26, 2019

(54) METHOD OF PRINTING, IMAGE FORMING APPARATUS AND PRINT

(71) Applicant: Xerox Corporation, Norwalk, CT (US)

(72) Inventors: Varun Sambhy, Pittsford, NY (US); Santokh S. Badesha, Pittsford, NY (US); Alexander N. Klymachyov, Webster, NY (US); David S. Derleth, Webster, NY (US); John R. Lambie, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/952,891

(22) Filed: Apr. 13, 2018

(51) Int. Cl.
| | |
|---|---|
| *G03G 15/20* | (2006.01) |
| *C09D 183/08* | (2006.01) |
| *C09D 183/04* | (2006.01) |
| *G03G 15/36* | (2006.01) |
| *G03G 15/00* | (2006.01) |

(52) U.S. Cl.
CPC ......... *C09D 183/08* (2013.01); *C09D 183/04* (2013.01); *G03G 15/2064* (2013.01); *G03G 15/36* (2013.01); *G03G 15/6582* (2013.01); *G03G 15/6585* (2013.01)

(58) Field of Classification Search
CPC ...................... G03G 15/6582; G03G 15/6585
See application file for complete search history.

(56) References Cited

U.S. PATENT DOCUMENTS

2003/0224178 A1\* 12/2003 Chen .................. G03G 15/2057
428/422

\* cited by examiner

*Primary Examiner* — Peter L Vajda
(74) *Attorney, Agent, or Firm* — Hoffman Warnick LLC

(57) ABSTRACT

There is described a printing method, an image apparatus and a print. A release fluid is provided for use in the printing method, imaging apparatus and print. The release fluid is a blend an amino functional silicone fluid and a non-functional silicone fluid. The amount of the amino functional silicone fluid is from about 10 weight percent to about 90 weight percent of the release fluid. The amount of the non-functional silicone fluid is from about 10 weight percent to about 90 weight percent of the release fluid. The amount of silanol (Si—OH) is less than 200 ppm in the release fluid.

20 Claims, 4 Drawing Sheets

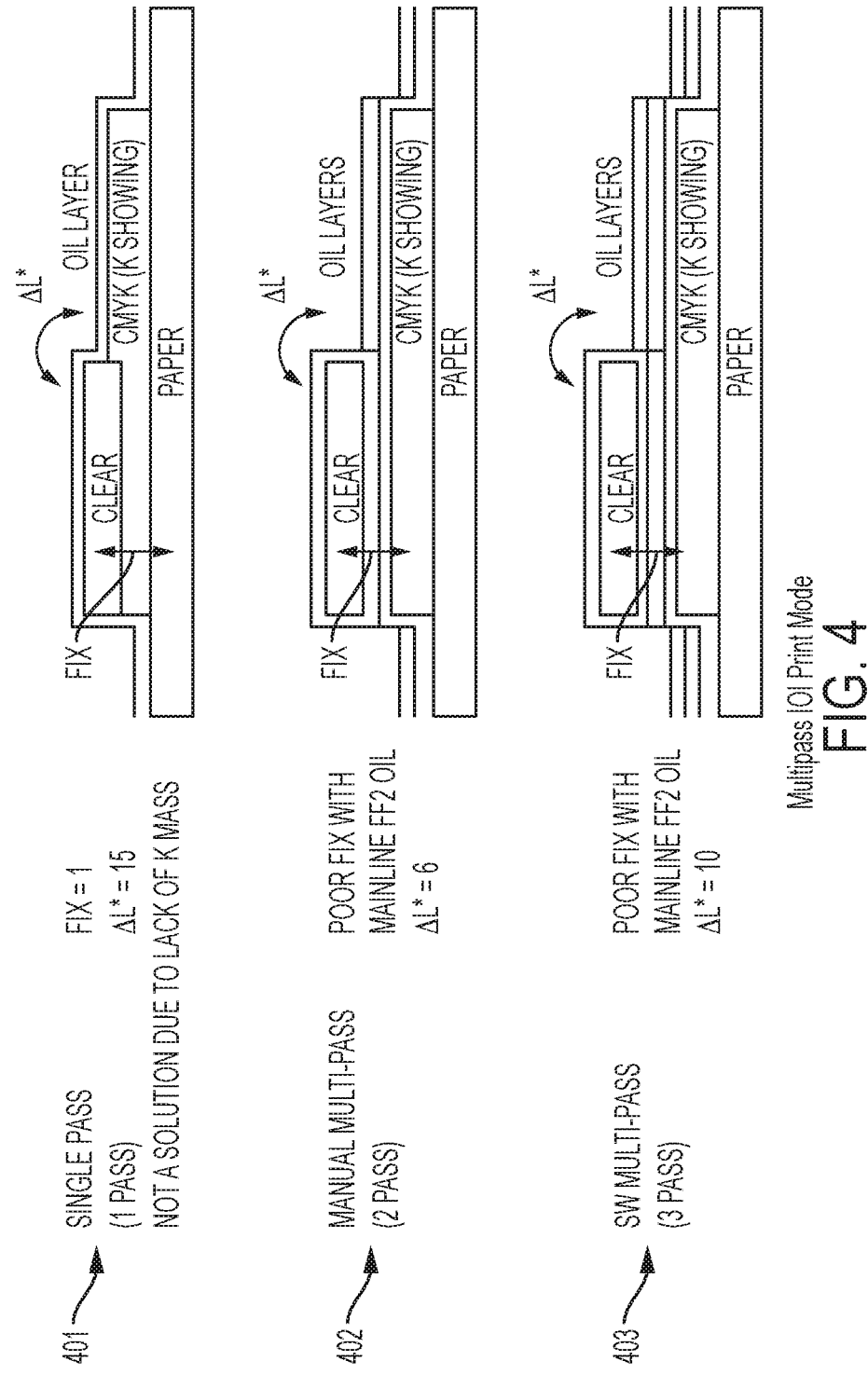

METHOD OF PRINTING, IMAGE FORMING APPARATUS AND PRINT

CROSS REFERENCE TO RELATED APPLICATIONS

This application relates to commonly assigned copending application Ser. No. 15/952,865, RELEASE FLUID COMPOSITION, filed simultaneously herewith and incorporated by reference herein. This application relates to commonly assigned copending application Ser. No. 15/952,908, RELEASE FLUID ADDITIVES, filed simultaneously herewith and incorporated by reference herein.

BACKGROUND

Field of Use

The disclosure herein is directed to release fluids or agents that are useful in release coating in toner-based technologies.

Background

In electrostatographic reproducing apparatuses, including digital, image on image, and contact electrostatic printing apparatuses, a light image of an original to be copied is typically recorded in the form of an electrostatic latent image upon a photosensitive member and the latent image is subsequently rendered visible by the application of electroscopic thermoplastic resin particles and pigment particles, or toner. The residual toner image can be either fixed directly upon the photosensitive member or transferred from the member to another support, such as a sheet of plain paper with subsequent fixing or fusing.

In order to fix or fuse the toner onto a support member permanently by heat, it is necessary to elevate the temperature of the toner to a point at which the constituents of the toner coalesce and become tacky. This heating action causes the toner to flow to some extent into the fibers or pores of the support member. Thereafter, as the toner cools, solidification of the toner causes the toner to be bonded firmly to the support member.

Typically, the thermoplastic resin particles are fused to the substrate by heating to a temperature of from about 90° C. to about 200° C. or higher, depending on the softening range of the particular resin used in the toner. It may be undesirable, however, to increase the temperature of the substrate substantially higher than about 250° C. because the substrate may discolor, scorch or ignite at such elevated temperatures, particularly when the substrate is paper.

Several approaches to thermal fusing of electroscopic toner images have been described. These methods include providing the application of substantial heat and pressure concurrently by various means, including fuser members such as a roll pair maintained in pressure contact, a belt member in pressure contact with a roll, a belt member in pressure contact with a heater, and the like. Heat can be applied by heating one or both of the rolls, plate members, belt members, or the like. The fuser member can be in the form of a roller, drum, belt, sheet, film, drelt (a hybrid between a roll and a belt), and the like. The fusing of the toner particles occurs when the proper combination of heat, pressure, and/or contact for the optimum time period are provided. The balancing of these variables to bring about the fusing of the toner particles can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip affect the fusing of the toner image onto the support.

U.S. Pat. No. 7,208,258 to Gervasi et al. discloses the use of a fuser member and a blend of two different amine-functional polyorganosiloxanes as release agents.

U.S. Pat. No. 7,291,399 to Kaplan et al. discloses a fuser member in combination with a blended polyorganosiloxane fluid wherein fluids with both mercapto-functional and amine-functional groups are utilized.

U.S. Pat. No. 9,599,918 to Morales-Tirado et al. discloses a clear toner composition for use in offset printing.

In high-speed color fusing applications, adequate coverage of the fuser member surface is required to meet the demanding environmental conditions and exposure to various levels of toner materials and additives, rapid high temperature thermal cycling and various media composition and weights. Amino silicone release agents are typically used in such high-speed color fusing systems, due to their ability to sufficiently react with the fluoroelastomer surface coatings that are used in conventional fuser member component compositions.

Most high-speed electrophotographic printing systems are embodied by four colors of toner in the development subsystem. These toner colors are most commonly cyan, magenta, yellow, and black. There is a need for expanded color gamut or additional image effects which may include the use of a fifth color station or development housing incorporating the use of clear, white, violet, green, orange, blue, fluorescent, and the like, or toner compositions of custom colors. Additional printing system failure modes may be introduced when expanding a printing system to include a fifth housing for additional toner configurations. In embodiments, high-speed electrostatographic color printing systems include a fifth station to provide a secondary imaging operation whereby added effect or color gamut expansion is enabled by the deposition of a fifth toner after a first fusing step. This results in a thin layer release fluid on the surface of the fused print, which is subsequently re-introduced into the development system and the fusing system a second time. The thin layer of release fluid on the surface of the fused print inhibits adhesion of the toner from the second printing operation to the surface of the print.

Therefore, it is desired to provide a fuser member release fluid that provides sufficient wetting, while maintaining and enabling sufficient fix and toner adhesion to prints throughout all steps of a multi-pass printing operation.

SUMMARY

In one aspect, there is described a multi-pass printing method. The method includes passing a substrate through a printing process where an image is printed onto the substrate. The method includes applying a release fluid on the substrate having the printed image and passing a same side of the same substrate through a second printing process to apply a toner layer onto the substrate having a printed image. The release fluid is a blend of an amino functional silicone fluid and a non-functional silicone fluid. The amino silicone functional fluid is represented by:

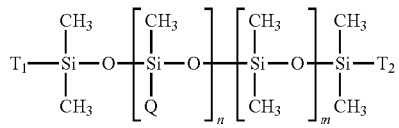

where Q represents —R$_1$—X, R$_1$ represents an alkyl group having from about 1 to about 10 carbons, X represents —NH$_2$ or —NHR$_2$NH$_2$ with R$_2$ having the same description as R$_1$. In the amino functional release fluid n is an integer from 1 to 50 and m is an integer from 10 to 5,000. The non-functional silicone fluid is represented by:

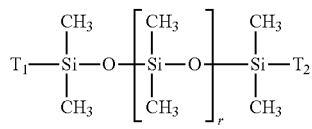

where r is an integer from 10 to 5,000. In both the amino functional silicone fluid and the non-functional silicone fluid T$_1$ and T$_2$ are methyl (—CH3), or hydroxyl (—OH). The amount of the amino functional silicone fluid is from about 10 weight percent to about 90 weight percent of the release fluid. The amount of the non-functional silicone fluid is from about 10 weight percent to about 90 weight percent of the release fluid. An amount of silanol (Si—OH) is less than 200 ppm in the release fluid. The amount of silanol (Si—OH) is defined as moles of Si—OH moieties over total moles of silicon atoms.

In another aspect, an image forming apparatus including a photoreceptor having a photosensitive layer, a charging device which charges the photoreceptor, an exposure device which exposes the charged photoreceptor to light, thereby forming an electrostatic latent image on a surface of the photoreceptor. The image forming apparatus includes at least 5 developer stations for developing at least 5 toner images on a surface of the photoreceptor and at least one transfer device for transferring the toner images to a recording medium. The image forming apparatus includes a fuser station for fixing the toner images transferred to the recording medium by heating the recording medium, thereby forming a fused image on the recording medium. The fusing station includes a fuser member, a pressure member and a release fluid in combination with said fuser member. The release fluid is a blend of an amino functional silicone fluid and a non-functional silicone fluid. The amino silicone functional fluid is represented by:

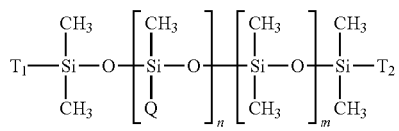

where Q represents —R$_1$—X, R$_1$ represents an alkyl group having from about 1 to about 10 carbons, X represents —NH$_2$ or —NHR$_2$NH$_2$ with R$_2$ having the same description as R$_1$. In the amino functional release fluid n is an integer from 1 to 50 and m is an integer from 10 to 5,000. The non-functional silicone fluid is represented by:

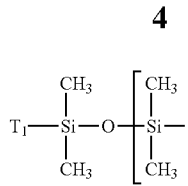

where r is an integer from 10 to 5,000. In both the amino functional silicone fluid and the non-functional silicone fluid T$_1$ and T$_2$ are methyl (—CH3), or hydroxyl (—OH). The amount of the amino functional silicone fluid is from about 10 weight percent to about 90 weight percent of the release fluid. The amount of the non-functional silicone fluid is from about 10 weight percent to about 90 weight percent of the release fluid. The amount of silanol (Si—OH) is less than 200 ppm in the release fluid. The amount of silanol (Si—OH) is defined as moles of Si—OH moieties over total moles of silicon atoms.

In another aspect, there is described a print including a first marking material layer, a release fluid coating layer positioned on said first marking material layer, and an outer marking material layer positioned on said release fluid coating layer. The release fluid coating layer is a blend of an amino functional silicone fluid and a non-functional silicone fluid. The amino silicone functional fluid is represented by:

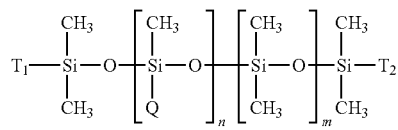

where Q represents —R$_1$—X, R$_1$ represents an alkyl group having from about 1 to about 10 carbons, X represents —NH$_2$ or —NHR$_2$NH$_2$ with R$_2$ having the same description as R$_1$. In the amino functional release fluid n is an integer from 1 to 50 and m is an integer from 10 to 5,000. The non-functional silicone fluid is represented by:

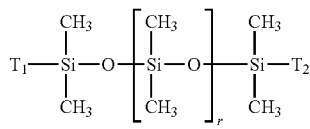

where r is an integer from 10 to 5,000. In both the amino functional silicone fluid and the non-functional silicone fluid T$_1$ and T$_2$ are methyl (—CH3), or hydroxyl (—OH). The amount of the amino functional silicone fluid is from about 10 weight percent to about 90 weight percent of the release fluid. The amount of the non-functional silicone fluid is from about 10 weight percent to about 90 weight percent of the release fluid. The amount of silanol (Si—OH) is less than 200 ppm in the release fluid. The amount of silanol (Si—OH) is defined as moles of Si—OH moieties over total moles of silicon atoms.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

FIG. 4 is a process diagram depicting the present understanding of multi-pass BM print mode in accordance with the present disclosure.

Figure 1:
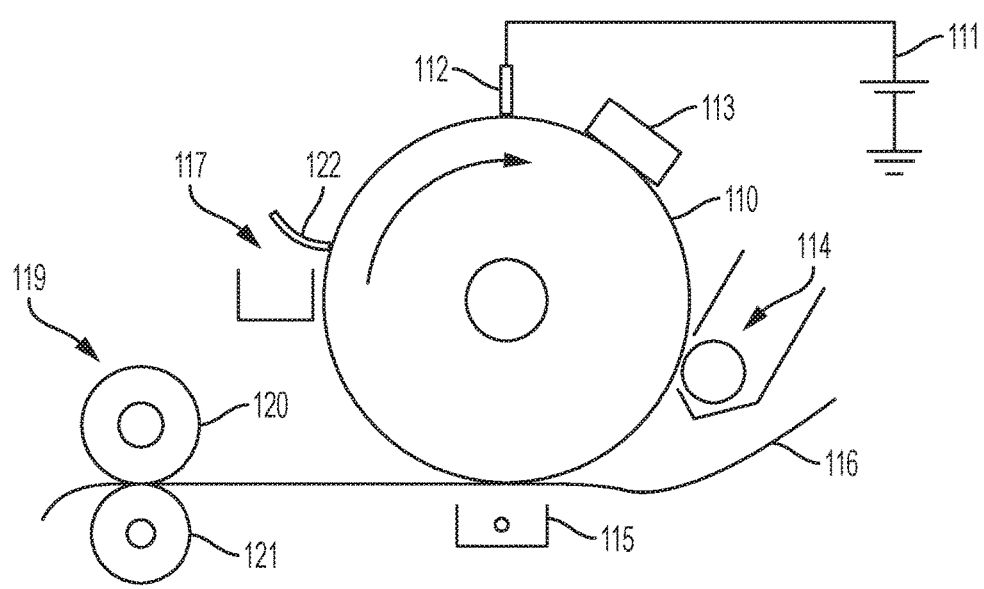
FIG. 1 is a schematic illustration of an image forming apparatus in accordance with the present disclosure.

It should be noted that some details of the FIGS. have been simplified and are drawn to facilitate understanding of the embodiments rather than to maintain strict structural accuracy, detail, and scale.

DETAILED DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely illustrative.

Illustrations with respect to one or more implementations, alterations and/or modifications can be made to the illustrated examples without departing from the spirit and scope of the appended claims. In addition, while a particular feature may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

Although embodiments of the disclosure herein are not limited in this regard, the terms "plurality" and "a plurality" as used herein may include, for example, "multiple" or "two or more." The terms "plurality" or "a plurality" may be used throughout the specification to describe two or more components, devices, elements, units, parameters, or the like. For example, "a plurality of resistors" may include two or more resistors.

Referring to FIG. 1, in an electrostatic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 110 is charged on its surface by a charger 112 to which a voltage has been supplied from power supply 111. The photoreceptor 110 is then imagewise exposed to light from an optical system or an image input apparatus 113, such as a laser and light emitting diode, to form an electrostatic latent image on the photoreceptor 110. Generally, the electrostatic latent image is developed by bringing a developer mixture from developer station 114 into contact herewith. Development can be effected by use of a magnetic brush, powder cloud, or other known development process (not shown). A dry developer mixture usually comprises carrier granules having toner particles adhering triboelectrically thereto. Toner particles are attracted from the carrier granules to the latent image, forming a toner powder image. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface, in image configuration, they are transferred to a copy sheet 116 by transfer apparatus 115, which can be performed by pressure transfer or electrostatic transfer. Alternatively, the developed image can be transferred to an intermediate transfer member, or bias transfer member, and subsequently transferred to a copy sheet. Examples of copy substrates include paper, transparency material such as polyester, polycarbonate, or the like, cloth, wood, or any other desired material upon which the finished image will be situated.

After the transfer of the developed image is completed, copy sheet 116 advances to fusing station 119, depicted in FIG. 1 as fuser roll 120 and pressure roll 121 (although any other fusing member components such as fuser belt in contact with a pressure roll, fuser roll in contact with pressure belt, and the like, are suitable for use with the present apparatus), where the developed image is fused to copy sheet 116 by passing copy sheet 116 between the fusing and pressure members, thereby forming a permanent image. Alternatively, transfer and fusing can be effected by a transfix application. Photoreceptor 110, subsequent to transfer, advances to cleaning station 117, where any toner left on photoreceptor 110 is cleaned therefrom by use of a blade 122 (as shown in FIG. 1), brush, or other cleaning apparatus. Alternatively, transfer and fusing can be effected by a transfix application.

Figure 2:
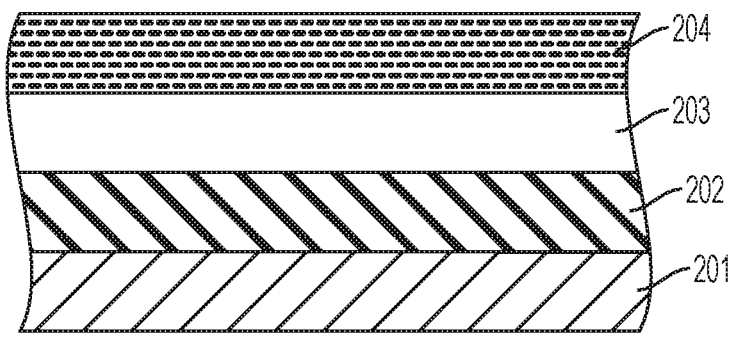
FIG. 2 is an enlarged, side view of an embodiment of a fuser member, showing a fuser member with a substrate, intermediate layer, outer layer, and release coating layer in accordance with the present disclosure.

FIG. 2 is an enlarged schematic view of an embodiment of a fuser member, demonstrating the various possible layers. As shown in FIG. 2, substrate 201 includes an optional intermediate layer 202. Intermediate layer 202 can be, for example, a rubber such as silicone rubber or other suitable rubber material. On the intermediate layer 202 is positioned an outer layer 203. Positioned on the outer layer 203 is an outermost release fluid or agent 204, described in more detail below.

The outer layer 203 may be selected from the group consisting of a silicone elastomer, a fluorosilicone elastomer, a fluoroelastomer, a fluorinated hydrocarbon polymer, a fluorinated hydrocarbon and silicone polymer blend, silicone copolymers, and crosslinked blends of fluorinated hydrocarbon copolymers and silicone copolymers.

Examples of the outer surface of the fuser system members include fluoroelastomers and hydrofluoroelastomers.

Specifically, suitable fluoroelastomers are those described in detail in U.S. Pat. Nos. 5,166,031, 5,281,506, 5,366,772 and 5,370,931, together with U.S. Pat. Nos. 4,257,699, 5,017,432 and 5,061,965, the disclosures each of which are incorporated by reference herein in their entirety. As described therein, these elastomers are from the class of: 1) copolymers of vinylidenefluoride and hexafluoropropylene; 2) terpolymers of vinylidenefluoride, hexafluoropropylene and tetrafluoroethylene; and 3) tetrapolymers of vinylidenefluoride, hexafluoropropylene, tetrafluoroethylene and cure site monomer, are known commercially under various designations as VITON A®, VITON B®, VITON E®, VITON E 60C®, VITON E430®, VITON 910®, VITON GH®; VITON GF®; and VITON ETP®. The VITON® designation is a Trademark of E.I. DuPont de Nemours, Inc. The cure site monomer can be 4-bromoperfluorobutene-1,1,1-dihydro-4-bromo-perfluorobutene-1,3-bromoper-fluoro-propene-1,1,1-dihydro-3-bromoperfluoro-propene-1, or any other suitable, known cure site monomer commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a Trademark of 3M Company. Additional commercially available materials include AFLAS®, a poly(propylenetetra-fluoroethylene), and FLUOREL II® (LII900), a poly(propylene-tetrafluoroethylene-vinylidenefluoride), both also available from 3M Company, as well as the Tecnoflons identified as FOR-60KIR®, FOR-LHF®, NM® FOR-THF®, FOR-TFS®, TH®, and TN505®, available from Montedison Specialty Chemical Company.

The fluoroelastomers VITON GH® and VITON GF® have relatively low amounts of vinylidenefluoride. The VITON GF® and Viton GH® have about 35 weight percent of vinylidenefluoride, about 34 weight percent of hexafluoropropylene and about 29 weight percent of tetrafluoroethylene with about 2 weight percent cure site monomer.

The amount of fluoroelastomer compound in solution in the outer layer solutions, in weight percent total solids, is from about 10 to about 25 percent, or from about 16 to about 22 percent by weight of total solids. Total solids as used herein include the amount of fluoroelastomer, dehydrofluorinating agent and optional adjuvants and fillers, including metal oxide fillers. In addition to the fluoroelastomer, the outer layer may comprise a fluoropolymer or other fluoroelastomer blended with the above fluoroelastomer. Examples of suitable polymer blends include the above fluoroelastomer, blended with a fluoropolymer selected from the group consisting of polytetrafluoroethylene and perfluoroalkoxy. The fluoroelastomer can also be blended with non-fluorinated ethylene or non-fluorinated propylene.

An inorganic particulate filler may be used in connection with the polymeric outer layer, in order to provide anchoring sites for the functional groups of the fuser agent. Examples of suitable fillers include inorganic fillers such as silicas or a metal-containing filler, such as a metal, metal alloy, metal oxide, metal salt, or other metal compound. The general classes of metals which can be used include those metals of Groups 1b, 2a, 2b, 3a, 3b, 4a, 4b, 5a, 5b, 6b, 7b, 8, and the rare earth elements of the Periodic Table. For example, the filler can be an oxide of aluminum, copper, tin, zinc, lead, iron, platinum, gold, silver, antimony, bismuth, zinc, iridium, ruthenium, tungsten, manganese, cadmium, mercury, vanadium, chromium, magnesium, nickel and alloys thereof. Other specific examples include inorganic particulate fillers of aluminum oxide, and cupric oxide; reinforcing and non-reinforcing calcined alumina and tabular alumina, respectively, along with silicas. Other fillers include various forms of carbon, such as carbon nanotubes, graphene or other forms of carbon; and doped metal oxides such as antimony-doped tin oxide, indium-doped tin oxide, and the like. The filler may include just one filler or a mixture of fillers.

The thickness of the outer layer 203 of the fuser member herein is from about 10 to about 250 micrometers, or from about 5 to about 100 micrometers, or from about 1 to about 50 micrometers.

Optional intermediate adhesive layers and/or intermediate polymer or elastomer layers may be applied to achieve desired properties and performance objectives of the embodiments herein. The intermediate layer may be present between the substrate and the outer polymeric surface. Examples of suitable intermediate layers include silicone rubbers such as room temperature vulcanization (RTV) silicone rubbers; high temperature vulcanization (HTV) silicone rubbers and low temperature vulcanization (LTV) silicone rubbers. These rubbers are known and readily available commercially such as SILASTIC® 735 black RTV and SILASTIC® 732 RTV, both from Dow Corning; and 106 RTV Silicone Rubber and 90 RTV Silicone Rubber, both from General Electric. Other suitable silicone materials include the siloxanes (such as polydimethylsiloxanes); and the like. Another specific example is Dow Corning Sylgard 182. An adhesive intermediate layer may be selected from, for example, epoxy resins and polysiloxanes.

There may also be provided an adhesive layer between the substrate and the intermediate layer. There may also be an adhesive layer between the intermediate layer and the outer layer. In the absence of an intermediate layer, the outer layer may be bonded to the substrate via an adhesive layer. The thickness of the intermediate layer is from about 0.5 to about 20 mm, or from about 1 to about 10 mm, or from about 3 to about 5 mm.

In embodiments, the release fluids or agents described herein are provided onto the outer layer of the fuser member via a delivery mechanism such as a delivery roll. The delivery roll is partially immersed in a sump, which houses the release fluid or agent.

The release fluids or agents are renewable in that the release fluid or agent is housed in a holding sump and provided to the fuser roll when needed, optionally by way of a release fluid donor roll in an amount of from about 0.1 to about 20 mg/copy, or from about 1 to about 12 mg/copy. The system by which fuser release fluid is provided to the fuser roll via a holding sump and, optionally, a donor roll is well known. The release fluid may be present on the fuser member surface in a continuous or semi-continuous phase. The release fluid in the form of a film is in a continuous phase and continuously covers the fuser member.

A traditional release agent management system (RAM) applies release fluid to the fuser roll at an idle release fluid rate (or no release fluid) when a print job is not running, and at a steady state running release fluid rate when a print job is running. These systems change from the idle release fluid rate to the steady state running oil rate when a print job is started.

Multipass Printing with Extended Gamut or Custom Toner Printing

Figure 3:
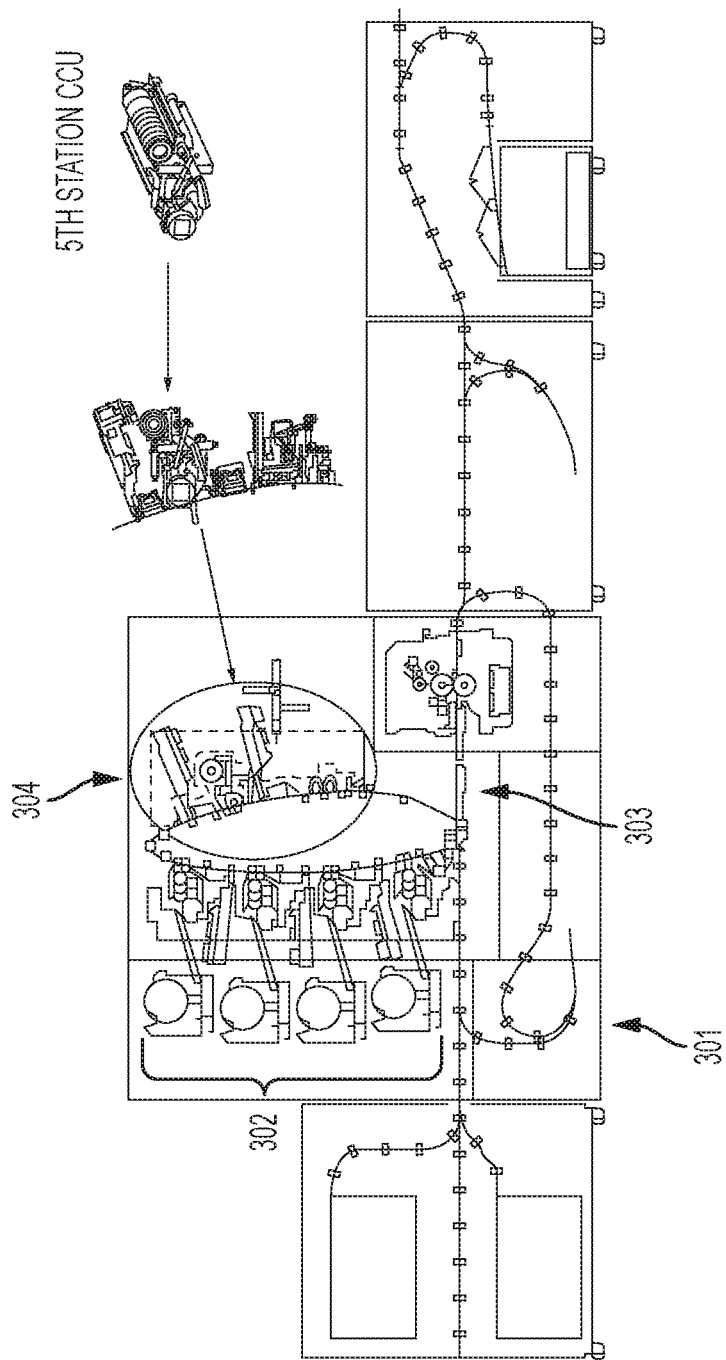
FIG. 3 is a side view of a printing system with a customer changeable modular unit to enable color swapping for gamut extension in accordance with the present disclosure.

Implementing specialty toners for the purpose of special effects or gamut extension for use in machines such as those sold under the tradename iGen® platform (clear, white, metallic, fluorescent, orange, violet, green, and the like) in an additional or fifth developer housing may require multi-pass printing. FIG. 3 shows CMYK toner units 302. FIG. 3 depicts an embodiment of a printing system architecture having a fifth customer replaceable unit (304) for adding an additional specialty toner to an existing printing system configuration (301). The multi-pass printing is controlled at 303 in FIG. 3.

FIG. 4 is a depiction of several printing modes in an exemplary high-speed color printing system. In a single pass printing mode as depicted in 401, lowered mass of black toner results in unacceptable print quality and image density, while achieving sufficient fix levels and image permanence.

Multi-pass printing refers to a printing operation wherein a substrate is passed through the entire printing process where an image is printed and developed onto the substrate, followed by a secondary pass of the same side of the same substrate through the printing process for the purpose of printing an additional layer of toner onto the substrate. This operation can be conducted manually as depicted in 402, or automatically, as depicted in 403. In multi-pass Image on Image (IOI) print mode (403), a toner layer is developed on top of a fused CMYK (cyan, magenta, yellow, black) patch. Upon entering the secondary pass through the print process, a layer of release agent sometimes remains on the surface of the printed substrate which may interfere with toner adhesion to the surface of the previously printed substrate. The oil layer on top of the fused CMYK patch prevents the overlying clear toner layer from getting adequately fixed to the patch below (clear tone to CYMK patch adhesion). As result, the specialized toner can be easily scratched off and is unacceptable for customers. Because this release fluid layer on fused prints prevents anything else from sticking to the prints post-it notes do not adhere well to printed documents, and it is difficult to write on iGen documents. Further, there are label adhesion issues on iGen printed media and book binding issues. The release agent or release fluid adhesion issue may be a challenge to successful implementation of the overall printing platform, leading to poor image fix and quality or customer satisfaction. In addition to specialized toner, it will be necessary to resolve this multi-pass toner on fused patch fix issue to implement other specialty colors, for example, white, metallic silver, metallic gold, fluorescent security toner, and the like.

In addition, it is theorized that the amine group on the oil chemically reacts with the fluorinated elastomer and forms a homogenous robust oil layer on the roll surface.

Embodiments described herein include a release fluid of an amino functional siloxane as a fuser member release agent to enable good clear toner fix, and in embodiments, when used on fused CMYK patch in multi-pass IOI print mode.

Embodiments herein use an amino functional fluid. In an embodiments, the amino functional fluid is a blend containing an amino functional silicone fluid and a non-functional silicone fluid. The release fluid blend enables good clear toner fix.

The blended release fluid described herein includes a blend of Formula I (amino functional silicone fluid) and Formula II (non-functional silicone fluid).

Examples of suitable amino functional silicone fluids include those having pendant amino groups, such as those having the following Formula I:

Formula I

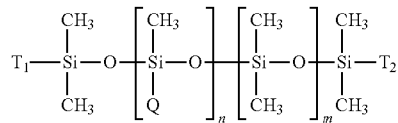

where Q represents —$R_1$—X, wherein $R_1$ represents an alkyl group having from about 1 to about 10 carbons. X represents —$NH_2$ or —$NHR_2NH_2$ with $R_2$ having the same description as $R_1$. In Formula I, n is an integer from 1 to 50, m is an integer from 10 to 5,000. $T_1$ and $T_2$ are methyl (—CH3), or hydroxyl (—OH) group. The structure in Formula I can be a block or a random copolymer. An amount of silanol (Si—OH) is defined as a molar ratio of Si—OH moieties over total number of silicon atoms. The amount of silanol is less than 200 ppm in the release fluid. In embodiments the amount of silanol is less than 150 ppm of the release fluid, or the amount of silanol is less than 50 ppm of the release fluid. The amount of silanol (Si—OH) is defined as moles of Si—OH moieties over total moles of silicon atoms.

In embodiments in Formula I, n is from about 1 to about 50, or from about 1 to about 25 or from about 1 to about 10; m is from about 10 to about 5,000, or from 50 to 1000 or from 100 to 1000. In embodiments, n is from about 1 to about 10 providing pendant groups that are mono-amino, di-amino, tri-amino, tetra-amino, penta-amino, hexa-amino, hepta-amino, octa-amino, nona-amino, deca-amino, and the like.

In embodiments, X represents —$NH_2$, and in other embodiments, $R_1$ is propyl. In embodiments, X represents —$NHR_2NH_2$, and in embodiments, $R_2$ is propyl.

In embodiments, the Formula I has a molecular weight (Mw) of from about 1,000 to about 100,000, or from about 1,000 to about 10,000 daltons and a viscosity of from about 10 to about 1,500 cS, or from about 50 to about 1,000 cS.

Examples of suitable non-functional silicone release fluids (component b) include those having the following Formula II:

Formula II

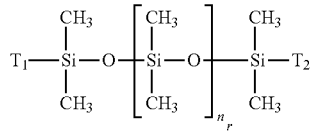

In Formula II, r is an integer from 10 to 5,000. $T_1$ and $T_2$ are methyl (—CH3), or hydroxyl (—OH). The structure in Formula II can be a block or a random copolymer.

In embodiments in Formula II, r is from about 10 to about 5,000, or from 50 to 1000 or from 100 to 1000.

In embodiments, Formula II has a molecular weight (Mw) of from about 1,000 to about 100,000, or from about 1,000 to about 10,000 daltons and a viscosity of from about 10 to about 1,500 cS, or from about 50 to about 1,000 cS.

The amount of Formula I in the release fluid blend is from 10 weigh percent to about 90 weight percent of the blended release fluid. In embodiments, the amount of Formula I is from 15 weight percent to 85 weight percent in the release fluid blend, or from 20 weight percent to about 80 weight percent blended release fluid blend. In embodiments, the amount of Formula II is from 10 weight percent to 90 weight percent. In embodiments, the amount of Formula II is from 15 weight percent to 85 weight percent or from 20 weight percent to about 80 weight percent of the release fluid blend.

In embodiments, the release fluid of the blend of Formula I and Formula II has a specific amine content and viscosity. For example, the release fluid has a mole percent amine of about 0.01 to about 0.9, or from about 0.03 to about 0.6, or from about 0.08 to about 0.50, or from 0.09 to 0.40, or from 0.15 to 0.25. Mole percent amine refers to the relationship: 100×(moles of amine groups/moles of silicon atoms).

In embodiments, the release fluid of the blend of Formula I and Formula II has a viscosity of from about 50 to about 600 or from about 60 to about 500 or from about 70 to about 400 centipoise. The silicone release fluid can have terminal silanol Si—OH groups during synthesis of the silicone release fluid.

The silicone release fluid described herein can form silanol Si—OH terminal end chains because of scission of the release fluid as shown schematically below;

release fluid were dissolved in 500 μL deuterated chloroform and 30 μL of trichloroacetyl isocyanate (TAIL) were added to the solution. Upon addition TAIC reacts with Si—OH forming urethane and shifts adjacent dimethyl peaks downfield, separating them from the bulk of the methyl peaks therefore allowing quantification of the underlying Si—OH groups.

Two different fuser release fluids were tested in iGen machine for toner to toner adhesion. RF-1 was the current mainline release fluid for iGen (Fuser Fluid II, Xerox Part Number 008R13096). Release Fluid 2 (RF-2) was test silicone release fluid provided by Wacker Chemical Corporation. The properties of different oils is given in Table 1 below.

TABLE 1

| Release Fluid | Amine mol % | Silanol (ppm) |
|---|---|---|
| RF-1 | 0.24 | 550 |
| RF-2 | 0.2 | 30 |

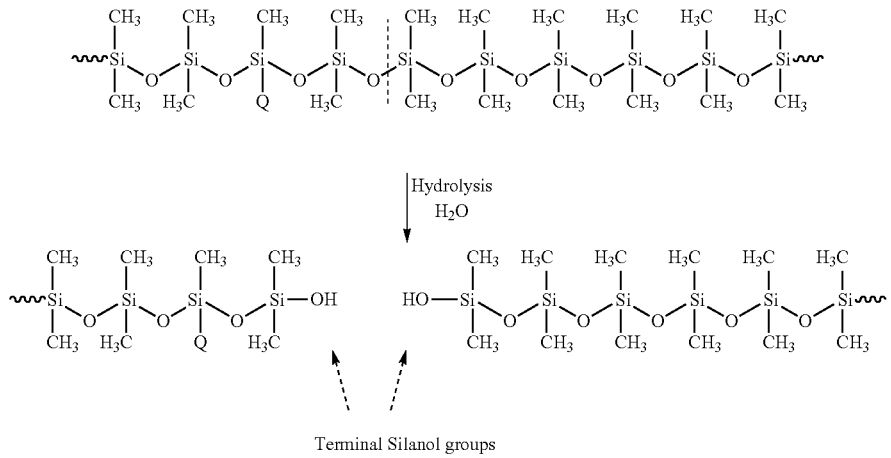

Terminal Silanol groups

Scission of the release fluid may occur during release fluid synthesis, storage of the release fluid or during operation of the electrostatographic machine. When scission of the release fluid occurs, terminal silanol (Si—OH) groups are formed as shown above.

The silanol amount in oil can be measured using NMR. Free silanol in the release agent can react/interact with toner components thereby increasing toner component offset to the fuser roll. The amount of silanol in the release fluid greatly impact fuser roll life.

In embodiments, the oil has a molecular weight (Mw) of from about 1,000 to about 100,000, or from about 1,000 to about 10,000 daltons and a viscosity of from about 10 to about 1,500 cS, or from about 50 to about 1,000 cS.

Specific embodiments will now be described in detail. These examples are intended to be illustrative, and not limited to the materials, conditions, or process parameters set forth in these embodiments. All parts are percentages by solid weight unless otherwise indicated.

EXAMPLES

Measuring Silanol Level in Release Fluid

Silanol (terminal Si—OH groups) were measured by 1H NMR using a Bruker AV500 NMR spectrometer. 100 μL of Print tests were done on an iGen machine having a 5$^{th}$ station running clear toner or white toner in multipass print mode. The release fluid delivery RAM and fuser components were cleaned thoroughly before swapping and testing release fluids.

Multi-pass printing refers to a printing operation wherein a substrate is passed through the entire printing process where an image is printed and developed onto the substrate, followed by a secondary pass of the same side of the same substrate through the printing process for the purpose of printing an additional layer of toner onto the substrate. Customers can build up to 10 sequential toner layers using multipass print mode.

To test toner to toner adhesion with different release fluids, two kinds of multipass mode test prints were made. In test print type 1, a layer of CMYK (cyan, magenta, yellow and black) was put down on paper and passed through the iGen fuser to fix the toner to the paper. Then a second layer of clear toner layer was put on top of the previously fused CMYK print, and the resulting print was then passed through the fuser a second time to fix the clear toner layer to the underlying CMYK toner layer.

In test print type 2, a layer of white toner was put down on paper and passed through the iGen fuser to fix the white toner to the paper. Then a second layer of CMYK (cyan, magenta, yellow and black) toner layer was put on top of the previously fused white print, and the resulting print was then passed through the fuser a second time to fix the CMYK toner layer to the underlying white toner layer.

The iGen machine test prints provided a clear toner layer or a white toner layer on top of a previously fused toner patch in multi-pass print mode. The toner to toner adhesion was evaluated using a scratch testing SIR method described below.

The scratch test is performed by the operator manually scratching the toner patch in test print type 1 and test print type 2 (described above) with his or her fingernails. The scratch test is an SIR based on grading the magnitude of scratches seen on the print 1 to 5, with 1 being least easily scratched and 5 being most easily scratched. Print that can be scratched off easily indicates poor toner to toner adhesion multipass prints.

The results show that both clear (print type 1) and white toner (print type 2) gave significantly better scratch performance with low silanol release fluid RF-2 than high silanol release fluid RF-1. Prints made using RF-2 had very good toner to toner adhesion and could not be scratched off (scratch SIR of 1). Prints made using RF-1 had very poor toner to toner adhesion and could be easily scratched off (scratch SIR of 5). The results are shown in Table 2 below. The SIR values reported are an average of at least 10 prints being tested.

TABLE 2

| Release Fluid | Scratch Performance SIR | |
| --- | --- | --- |
| | Test Print Type 1 | Test Print Type 2 |
| RF-1 | 5 | 5 |
| RF-2 | 1 | 1 |

Every time a print passes through the fuser, the fuser roll leaves some amount of the release fluid on top of the fixed print. This residual release fluid on top of a fused print can prevent the subsequent layer of toner from getting properly fixed (poor toner to toner adhesion) to the underlying toner layer. This results in the top toner layer being easily scratched off. Release fluid containing low silanol levels were found to improve toner to toner adhesion in multipass print mode.

In summary, using low silanol level release fluid significantly improves clear and white toner to toner adhesion on previously fused patches in multi-pass IOI print mode. In addition to clear and white toner, the release fluids described herein resolve poor adhesion of any toner on a previously fused patch. This allows implementation of other specialty colors used in a 5th station e.g. metallic silver, metallic gold, fluorescent security toner, etc. The release fluid enables the customer to build up large number of multi-pass layers without resulting in poor scratch/adhesion performance, for example applying two layers of white toner on black paper to maximize hiding power followed by a layer of CMYK toner followed by a layer of white toner or clear toner.

The disclosure herein addresses other issues to fused iGen prints such as post-it note adhesion; ability to write on iGen prints, label adhesion and book binding issues.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

What is claimed is:

1. A multi-pass printing method comprising:
passing a substrate through a printer wherein an image is printed onto the substrate;
applying a release fluid on the substrate having the printed image; and
passing a same side of the substrate through the printer to apply a toner layer onto the substrate having a printed image, wherein the release fluid comprises;
a blend of an amino functional silicone fluid and a non-functional silicone fluid wherein the amino silicone functional fluid is represented by:

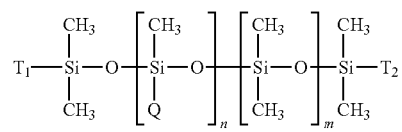

wherein Q represents —R$_1$—X, wherein R$_1$ represents an alkyl group having from about 1 to about 10 carbons, X represents —NH$_2$ or —NHR$_2$NH$_2$ with R$_2$ having the same description as R$_1$, n is an integer from 1 to 50, m is an integer from 10 to 5,000, wherein the non-functional silicone fluid is represented by:

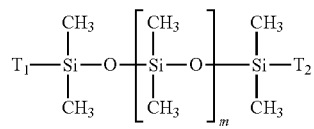

wherein r is an integer from 10 to 5,000, wherein T$_1$ and T$_2$ are methyl (—CH3), or hydroxyl (—OH), wherein an amount of the amino functional silicone fluid is from about 10 weight percent to about 90 weight percent of the release fluid and an amount of the non-functional silicone fluid is from about 10 weight percent to about 90 weight percent of the release fluid, wherein an amount of silanol (Si—OH) is less than 200 ppm in the release fluid.

2. The multi-pass printing method according to claim 1, wherein X represents an aminopropyl amine functional group.

3. The multi-pass printing method according to claim 1, wherein a mole percent of amine in the release fluid is from about 0.01 to about 0.90.

4. The multi-pass printing method according to claim 1, wherein the release fluid comprises a viscosity of from about 50 to about 600 centipoise.

5. The multi-pass printing method according to claim 1, wherein the printed image is a toner image.

6. The multi-pass printing method according to claim 1, wherein the substrate is selected from the group consisting of: paper, polyester, polycarbonate, cloth and wood.

7. The multi-pass printing method according to claim 1, wherein the toner layer is fixed by a fuser member.

8. The multi-pass printing method according to claim 7, wherein the fuser member comprises an outer layer selected from the group consisting of a silicone elastomer, a fluorosilicone elastomer, a fluoroelastomer, a fluorinated hydrocarbon polymer, a fluorinated hydrocarbon and silicone polymer blend.

9. The multi-pass printing method according to claim 8, wherein the fuser member further comprises an intermediate layer disposed under the outer surface.

10. An image forming apparatus comprising:
a photoreceptor having: a photosensitive layer; a charging device which charges the photoreceptor; an exposure device which exposes the charged photoreceptor to light, thereby forming an electrostatic latent image on a surface of the photoreceptor; and
at least 5 developer stations for developing at least 5 toner images on a surface of the photoreceptor;
at least one transfer device for transferring the toner images to a recording medium; and
a fuser station for fixing the toner images transferred to the recording medium by heating the recording medium, thereby forming a fused image on the recording medium, wherein the fuser station comprises a fuser member, a pressure member and a release fluid in combination with said fuser member wherein the release fluid comprises a blend of an amino functional silicone fluid and a non-functional silicone fluid, wherein the amino silicone functional fluid is represented by:

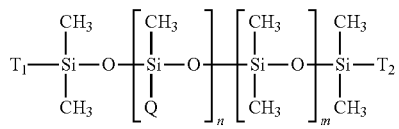

wherein Q represents —$R_1$—X, wherein $R_1$ represents an alkyl group having from about 1 to about 10 carbons, X represents —$NH_2$ or —$NHR_2NH_2$ with $R_2$ having the same description as $R_1$, n is an integer from 1 to 50, m is an integer from 10 to 5,000, wherein the non-functional silicone fluid is represented by:

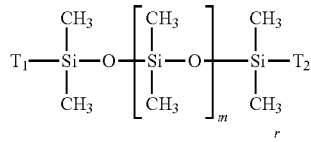

wherein r is an integer from 10 to 5,000, wherein $T_1$ and $T_2$ are methyl (—CH3), or hydroxyl (—OH), wherein an amount of the amino functional silicone fluid is from about 10 weight percent to about 90 weight percent of the release fluid and an amount of the non-functional silicone fluid is from about 10 weight percent to about 90 weight percent of the release fluid, wherein an amount of silanol (Si—OH) is less than 200 ppm in the release fluid.

11. The image forming apparatus according to claim 10, wherein X represents an aminopropyl amine functional group.

12. The image forming apparatus according to claim 10, wherein a mole percent of amine in the release fluid is from about 0.01 to about 0.90.

13. The image forming apparatus according to claim 10, wherein the release fluid comprises a viscosity of from about 50 to about 600 centipoise.

14. The image forming apparatus according to claim 10, wherein the fuser member includes an outer surface is selected from a group consisting of: a silicone elastomer, a fluorosilicone elastomer, a fluoroelastomer, a fluorinated hydrocarbon polymer, a fluorinated hydrocarbon and silicone polymer blend, silicone copolymers, and crosslinked blends of fluorinated hydrocarbon copolymers and silicone copolymers.

15. The image forming apparatus according to claim 14, further comprising an intermediate layer disposed under the outer surface.

16. The image forming apparatus according to claim 15, wherein the intermediate layer is selected from a group consisting of: silicone rubber and siloxane.

17. A print comprising:
a first marking material layer, a release fluid coating layer disposed on the first marking material layer, and an outer marking material layer disposed on said release fluid coating layer, the release fluid coating layer comprises a blend an amino functional silicone fluid and a non-functional silicone fluid wherein the amino silicone functional fluid is represented by:

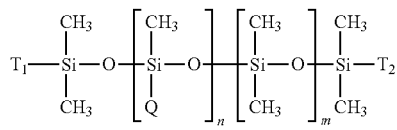

wherein Q represents —$R_1$—X, wherein $R_1$ represents an alkyl group having from about 1 to about 10 carbons, X represents —$NH_2$ or —$NHR_2NH_2$ with $R_2$ having the same description as $R_1$, n is an integer from 1 to 50, m is an integer from 10 to 5,000, wherein the non-functional silicone fluid is represented by:

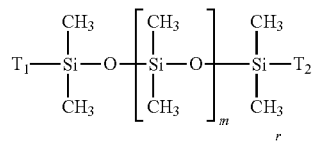

wherein r is an integer from 10 to 5,000, wherein $T_1$ and $T_2$ are methyl (—CH3), or hydroxyl (—OH), wherein an amount of the amino functional silicone fluid is from about 10 weight percent to about 90 weight percent of the release fluid and an amount of the non-functional silicone fluid is from about 10 weight percent to about 90 weight percent of the release fluid, wherein an amount of silanol (Si—OH) is less than 200 ppm in the release fluid.

18. The print according to claim 17, wherein X represents an aminopropyl amine functional group.

19. The print according to claim 17, wherein a mole percent of amine in the release fluid coating layer is from about 0.01 to about 0.90.

20. The print according to claim 17, wherein the release fluid comprises a viscosity of from about 50 to about 600 centipoise.

* * * * *